Patented Aug. 6, 1935

2,010,066

UNITED STATES PATENT OFFICE 2,010,066

MANUFACTURE OF ALIPHATIC KETONES

Henry Dreyfus, London, England

No Drawing. Application July 23, 1930, Serial No. 470,235. In Great Britain August 19, 1929

4 Claims. (Cl. 260—134)

This invention relates to the manufacture of ketones and especially to the manufacture of acetone.

According to the invention I have found that aliphatic ketones (and especially acetone) can be produced by subjecting the vapours of aliphatic primary alcohols containing at least two carbon atoms (and especially vapours of ethyl alcohol) in admixture with oxygen or a gas containing the same, such for instance as air, to the action of high temperatures in presence of a catalyst comprising a metal more electro-negative than magnesium, magnesium being considered an alkali earth metal. The said catalyst may contain either:—

(a) One or more metallic oxides (including the various oxides of metals which have oxides of various degrees of oxidation) including mixtures of two or several of such oxides whether of similar or dissimilar metals but excluding the use of one or more alkali or alkali earth metal oxides alone or, preferably, (b) One or more of the metallic oxides of (a) above in admixture with:—one or more alkali, or, preferably, alkali earth metal oxides, hydroxides or salts such as carbonates or other salts and especially salts of less strong acids such for instance as silicates or borates or (c) Instead of the metallic oxides of (a) above there may be used, alone or in admixture with the alkali or alkali earth metal oxides, hydroxides or salts of (b) above, and/or in admixture with the metallic oxides of (a) above, other compounds of the metals e. g. carbonates, or even the metals themselves. Preferably however when free metals are employed they are employed in admixture with the oxides of (a) above in presence or absence of the alkali or alkali earth metal compounds of (b) above.

As examples of the catalysts may be mentioned catalysts containing, in admixture or association with one or more oxides, hydroxides or salts (e. g. carbonates, borates, silicates) of calcium, barium, magnesium or other alkali earth metal, one or more of the following:—

Platinum (e. g. platinum black or platinized asbestos), copper, one or more iron oxides (e. g. ferric oxides), copper oxide, nickel oxide, cobalt oxide, one or more oxides of manganese (e. g. manganese dioxide), one or more oxides of lead or cerium or uranium.

The catalysts may, if desired, be employed spread upon, or deposited upon filling or contact materials such for instance as pumice, kieselguhr or the like.

The reaction of the invention may be performed at temperatures between about 200° and 700° C., and especially at temperatures between about 350° and 550° C.

The reaction may be performed under any desired pressure, whether higher or lower than normal atmospheric for instance under reduced pressure or "vacuum" or under higher pressures such as 5 to 10 or more atmospheres.

The mixture of the alcohol vapour and oxygen air (or other gaseous mixture containing oxygen) may be submitted to the reaction in any convenient way. As for instance the mixture may be passed in a rapid stream through a tube or other form of apparatus (e. g. a tube or apparatus of copper, iron, staybrite, earthenware or the like) filled or provided with the catalyst and heated to the desired temperature.

For the purposes of the invention I preferably employ mixtures of the alcohol vapor and oxygen (or gaseous mixture containing the same) containing more than two molecules of oxygen relatively to each molecule of the alcohol, or even containing substantially large proportions of oxygen e. g. containing from 5 to 20 or more parts by volume of oxygen to each volume of the alcohol.

If desired the process may be performed in presence of water vapor and/or aliphatic acid (e. g. acetic acid) vapor, and such vapor or vapors may, if desired, be introduced in even relatively large amounts such for instance as about 2 to 20 or more times the volume of that of the vapor of the alcohol.

The following example serves to illustrate a convenient form of execution of the invention but it is to be understood that the invention is not in any way limited thereto:—

Example

A mixture of ethyl alcohol, oxygen and acetic acid or water vapor in about the proportions 1:5:1, is passed through a tube (e. g. of copper) or other form of apparatus filled or provided with the catalyst, for example a mixture of ferric oxide and calcium carbonate, (e. g. a mixture of about equimolecular proportions) and maintained at a temperature of about 450–480° C. There results a copious yield of acetone. The crude acetone so produced can, if desired, be purified by subjecting it to fractional distillation.

What I claim and desire to secure by Letters Patent is:—

1. Process for the manufacture of an aliphatic ketone, which comprises subjecting a mixture of the vapor of a primary aliphatic alcohol containing at least two carbon atoms in the molecule and free oxygen to the action of a temperature between 350° and 550° C. in presence of a catalyst mass composed of iron oxide and calcium carbonate.

2. Process for the manufacture of acetone, which comprises subjecting a mixture of the vapor of ethyl alcohol and free oxygen to the action of a temperature between 350° and 550° C. in presence of a catalyst mass composed of iron oxide and calcium carbonate.

3. Process for the manufacture of acetone, which comprises subjecting a mixture of between 5 and 20 volumes of oxygen and 1 volume of ethyl alcohol to the action of a temperature between 200° and 700° C. in presence of a catalyst mass composed of iron oxide and calcium carbonate.

4. Process for the manufacture of acetone, which comprises subjecting a mixture of between 5 and 20 volumes of oxygen and 1 volume of ethyl alcohol to the action of a temperature between 450° and 480° C. in presence of a catalyst mass composed of iron oxide and calcium carbonate.

HENRY DREYFUS.